United States Patent
Hsu et al.

(10) Patent No.: US 10,712,838 B2
(45) Date of Patent: Jul. 14, 2020

(54) AUTOMATIC PENCIL TYPE POINTER

(71) Applicant: SHENZHEN PU YING INNOVATION TECHNOLOGY CORP., LTD., Shenzhen (CN)

(72) Inventors: Chung-Wen Hsu, Shenzhen (CN); Chung-Hsuan Li, Shenzhen (CN)

(73) Assignee: SHENZHEN PU YING INNOVATION TECHNOLOGY CORP., LTD., Shenzhen (CN)

(*) Notice: Subject to any disclaimer, the term of this patent is extended or adjusted under 35 U.S.C. 154(b) by 0 days.

(21) Appl. No.: 16/373,038

(22) Filed: Apr. 2, 2019

(65) Prior Publication Data

US 2020/0050295 A1 Feb. 13, 2020

(30) Foreign Application Priority Data

Aug. 7, 2018 (CN) .......................... 2018 1 0890247

(51) Int. Cl.
*G06F 3/0354* (2013.01)
*G06F 3/041* (2006.01)
*G06F 3/0346* (2013.01)

(52) U.S. Cl.
CPC ........ *G06F 3/03545* (2013.01); *G06F 3/0346* (2013.01); *G06F 3/041* (2013.01)

(58) Field of Classification Search
CPC .................................................. G06F 3/03545
See application file for complete search history.

(56) References Cited

U.S. PATENT DOCUMENTS 4,697,050 A * 9/1987 Farel ....................... G06F 3/046
178/19.07
2019/0227644 A1 * 7/2019 Nakayama ................ G06F 3/03

FOREIGN PATENT DOCUMENTS

TW 201616289 A 5/2016
TW 201716255 A 5/2017

OTHER PUBLICATIONS

TW Office Action dated Jul. 30, 2019.

* cited by examiner

*Primary Examiner* — Xuemei Zheng
(74) *Attorney, Agent, or Firm* — Rabin & Berdo, P.C.

(57) ABSTRACT

An automatic pencil type pointer includes a housing, a first circuit unit, a lead propelling unit, and a first electromagnetic unit. The housing has a port and an accommodation space in communication with the port. The first circuit unit is disposed in the accommodation space. The lead propelling unit is disposed in the accommodation space and includes a lead storage tube, a tip sleeve, a graphite lead, and a lead propelling assembly. The tip sleeve is disposed at the port. The graphite lead is accommodated in the lead storage tube. The lead propelling assembly is capable of controlling the graphite lead to be output from the tip sleeve. The first electromagnetic unit includes a first magnet and a first coil. The first coil is wound around the first magnet and is electrically connected to the first circuit unit. The graphite lead passes through the first magnet.

10 Claims, 7 Drawing Sheets

AUTOMATIC PENCIL TYPE POINTER

CROSS-REFERENCE TO RELATED APPLICATION

This non-provisional application claims priority under 35 U.S.C. § 119(a) to Patent Application No. 201810890247.3 filed in China, P.R.C. on Aug. 7, 2018, the entire contents of which are hereby incorporated by reference.

BACKGROUND

Technical Field

The present application relates to a pointer capable of generating digital handwriting, and in particular, to an automatic pencil type pointer.

Related Art

With the popularization of digital products, there are more diverse types of touch-type electronic products, and an operation mode of forming digital handwriting by using a pointer is well known.

However, in some use situations, some users are still accustomed to writing on papers by using physical ink. Based on this, the inventor considers that this use mode causes inconvenience to handwriting storage. In addition, the inconvenience to the handwriting storage lies in that when a user writes on a paper by using physical ink and intends to keep handwriting, the user can archive the handwriting only by using a scanner or by taking a photo. That is, after writing is performed by using ink, the handwriting can be kept only after another procedure. Even when a paper on which physical handwriting is stored is lost by accident, it is difficult to restore needed handwriting or a needed record. Therefore, an improvement is considered to be necessary.

SUMMARY

The present application provides an automatic pencil type pointer, including a housing, a first circuit unit, a lead propelling unit, and a first electromagnetic unit. The housing has a port and an accommodation space, and the port is in communication with the accommodation space. The first circuit unit is disposed in the accommodation space. The lead propelling unit is disposed in the accommodation space and includes a lead storage tube, a tip sleeve, a graphite lead, and a lead propelling assembly. The lead storage tube has an accommodation cavity. The tip sleeve is disposed at the port. The graphite lead is accommodated in the lead storage tube. The lead propelling assembly is disposed between the tip sleeve and the lead storage tube and is capable of controlling the graphite lead to be output from the tip sleeve. The first electromagnetic unit is disposed in the accommodation space and includes a first magnet and a first coil. The first magnet has a penetrating first through hole. The first coil is wound around the first magnet and is electrically connected to the first circuit unit, and the graphite lead passes through the first through hole.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
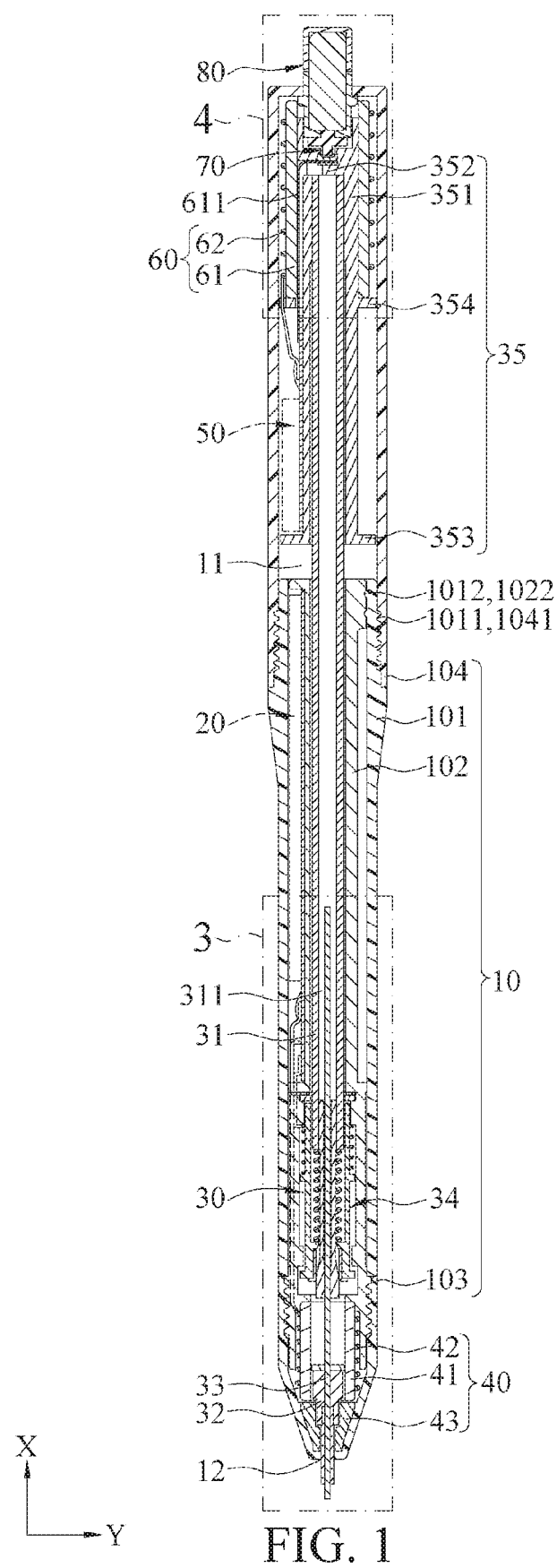
FIG. 1 is a schematic diagram of an embodiment of an automatic pencil type pointer according to the present invention.

Referring to FIG. 1, FIG. 1 is a schematic diagram of an embodiment of an automatic pencil type pointer according to the present invention. Herein, the pointer may perform electromagnetic induction while performing physical writing by using a graphite lead, to store digital handwriting. The graphite lead may be a crayon but is not limited thereto.

The automatic pencil type pointer shown in FIG. 1 includes a housing 10, a first circuit unit 20, a lead propelling unit 30, and a first electromagnetic unit 40.

Figure 2:
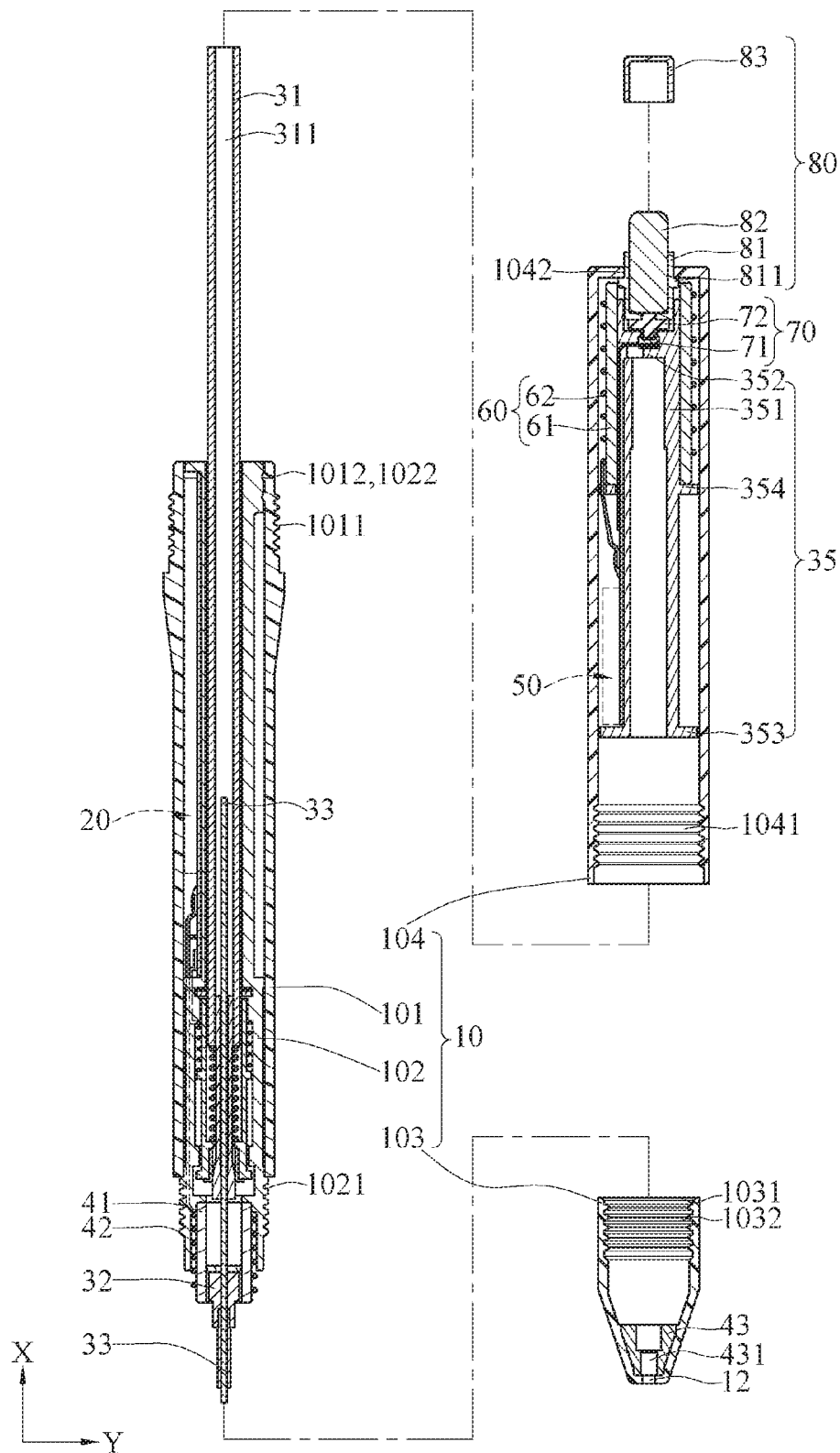
FIG. 2 is a schematic exploded view of a partial structure of the embodiment in FIG. 1.
Figure 3:
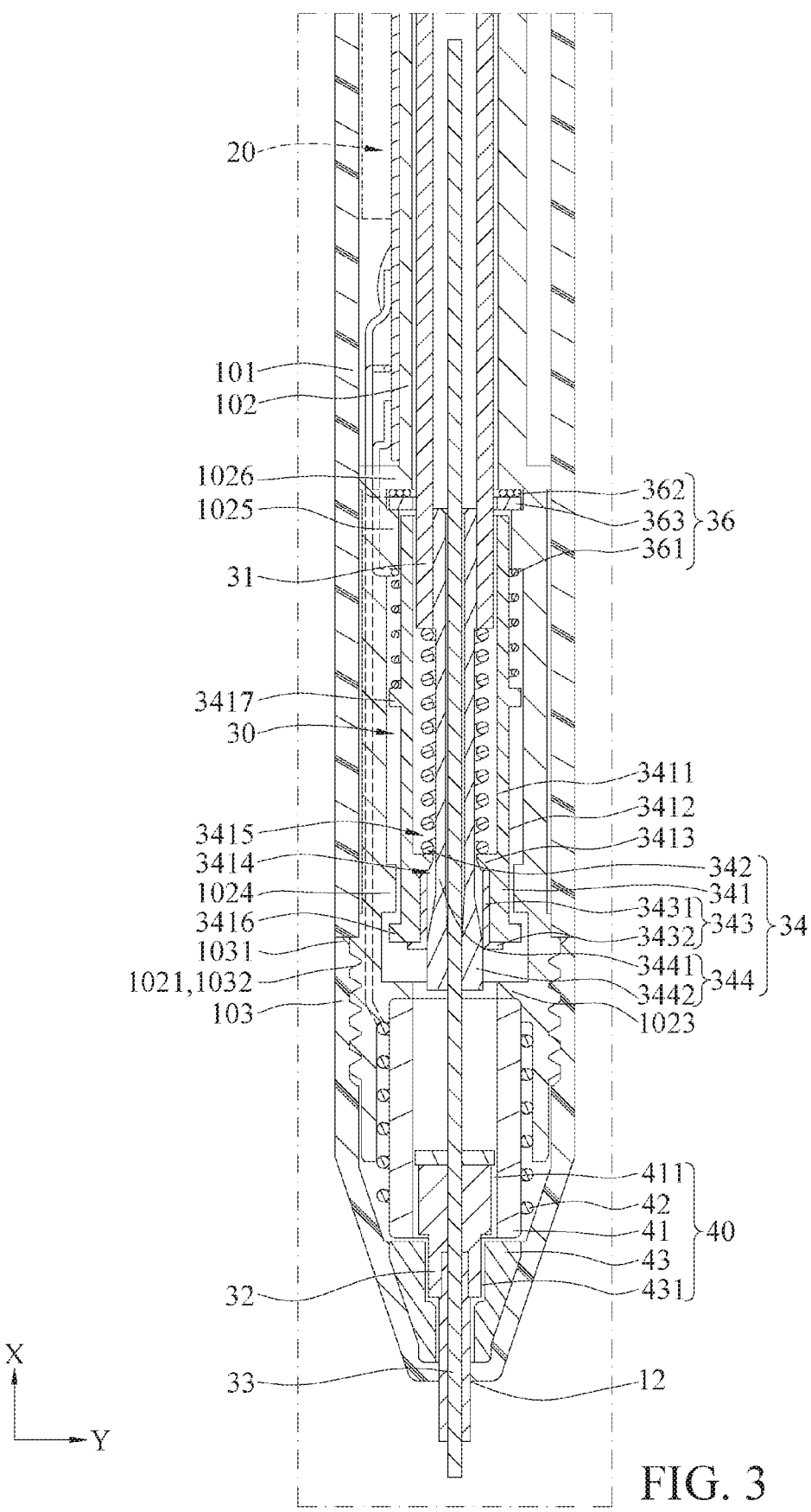
FIG. 3 is a partially enlarged view of a part 3 marked with a circle in FIG. 1.

Referring to FIG. 1 to FIG. 3, the housing 10 has an accommodation space 11 and a port 12 in communication with the accommodation space 11. The first circuit unit 20, the lead propelling unit 30, and the first electromagnetic unit 40 are separately disposed in the accommodation space 11. The lead propelling unit 30 includes a lead storage tube 31, a tip sleeve 32, a graphite lead 33, and a lead propelling assembly 34. The lead storage tube 31 has an accommodation cavity 311. The tip sleeve 32 is disposed at the port 12. The graphite lead 33 is accommodated in the accommodation cavity 311 of the lead storage tube 31. The lead propelling assembly 34 is disposed between the lead storage tube 31 and the tip sleeve 32 and controls the graphite lead 33 to be output from the tip sleeve 32 to draw authentic handwriting. The first electromagnetic unit 40 includes a first magnet 41 and a first coil 42. The first magnet 41 has a first through hole 411. The first coil 42 is wound around the first magnet 41 and is electrically connected to the first circuit unit 20. The graphite lead 33 passes through a first through hole 411.

Therefore, during use, physical writing with ink may be performed by using the lead propelling unit 30 alone or the pointer is used in cooperation with a digitizer to simultaneously record digital handwriting.

When the pointer is used in cooperation with the digitizer capable of transmitting electromagnetic energy, the first circuit unit 20 and the first coil 42 enable the pointer to transmit electromagnetic energy to the digitizer and receive and store electromagnetic energy transmitted by an antenna or an induction coil of the digitizer. Herein, the digitizer transmits the electromagnetic energy, and the pointer stores energy of an electromagnetic field and then transmits a signal to the digitizer. When the pointer performs writing and changes a relative position of the pointer with the digitizer, a magnetic field between the pointer and the digitizer changes. In this case, the digitizer can define a position of the pointer by means of an operation according to the change in the magnetic field. Therefore, while performing physical writing, the pointer can enable the digitizer to generate and record digital handwriting.

In an embodiment, referring to FIG. 1 again, the housing 10 is a hollow and strip pen-type housing that extends a length along an axial direction X, but is not limited thereto. Herein, the housing 10 is in a detachable split-structured form to facilitate disassembling and replacing internal components, but is not limited thereto.

In an embodiment, referring to FIG. 1, the first circuit unit 20 may be a printed circuit board. The circuit unit 20 includes an oscillation circuit and a control element, and is configured to calculate and define the position of the pointer.

In an embodiment, referring to FIG. 1 and FIG. 2, the lead storage tube 31 of the lead propelling unit 30 is a long hollow pole that extends a length along the axial direction X, and the accommodation cavity 311 of the lead storage tube 31 penetrates through two ends of the lead storage tube 31 along the axial direction X.

In an embodiment, referring to FIG. 1 to FIG. 4, the tip sleeve 32 is disposed on an end, close to the port 12, in the housing 10. The lead propelling assembly 34 is disposed between the tip sleeve 32 and the lead storage tube 31 and controls the graphite lead 33 to be output from the tip sleeve 32.

Referring to FIG. 1 and FIG. 2 again, the first magnet 41 is a hollow cylinder but is not limited thereto. In an embodiment, the first through hole 411 of the first magnet 41 penetrates through two ends of the first magnet 41 in the axial direction X. Therefore, the first magnet 41 has an outer surface and an inner surface that are opposite to each other. The inner surface is a face that surrounds and defines the first through hole 411. In addition, the first magnet 41 in this embodiment is made of a magnetic material. The first coil 42 is wound around the outer surface of the first magnet 41. Herein, two ends of the first coil 42 may be connected to the first circuit unit 20 through two conductive lines.

Specifically, referring to FIG. 1 to FIG. 3, the first magnet 41 is accommodated at a position, close to the port 12, in the accommodation space 11 and is sleeved over the tip sleeve 32 and the graphite lead 33, so that the graphite lead 33 penetrates through the first through hole 411 of the first magnet 41. In this embodiment, the graphite lead 33 is located at a medial axis position of the first magnet 41.

In this embodiment, referring to FIG. 1 and FIG. 2, the housing 10 is a combined housing that can be disassembled and separated. Herein, the housing 10 includes a pencil body 101, an inner tube 102, a head cover 103, and a tail cover 104. The pencil body 101 has a first end and a second end. A threaded portion 1011 is provided on an outer side of the first end of the pencil body 101, and a first clamping portion 1012 is provided on an inner side of the first end. Specifically, the threaded portion 1011 of the pencil body 101 is an outer thread, and the first clamping portion 1012 is a plurality of bumps.

Referring to FIG. 1 to FIG. 3, further, the inner tube 102 is sheathed in and fixed to an inner side of the pencil body 101. Herein, a threaded portion 1021 is provided on an outer side of one end of the inner tube 102, and a second clamping portion 1022 is provided on an outer side of the other end. When the inner tube 102 is sheathed in the pencil body 101, the threaded portion 1021 of the inner tube 102 penetrates out of the second end of the pencil body 101, and the second clamping portion 1022 of the inner tube 102 is clamped with and fixedly combined with the first clamping portion 1012 on the inner side of the pencil body 101. Specifically, the second clamping portion 1022 of the inner tube 102 is a groove whose quantity and shape correspond to those of the first clamping portion 1012.

Referring to FIG. 1 and FIG. 2 again together with FIG. 3, the head cover 103 has a funnel shape, one end of the head cover 103 is provided with a socket 1031, and the other end is the port 12. Herein, the socket 1031 extends to be in communication with the port 12, and a diameter of the socket 1031 is greater than that of the port 12. Specifically, an inner edge of the socket 1031 of the head cover 103 has a threaded portion 1032. Based on this, the head cover 103 can be in a threaded connection with the threaded portion 1021 of the inner tube 102 by using the threaded portion 1032 of the socket 1031.

Referring to FIG. 1 and FIG. 2, a threaded portion 1041 is provided on an inner side of one end of the tail cover 104. Based on this, the threaded portion 1041 of the tail cover 104 can be in a threaded connection with the threaded portion 1011 of pencil body 101 in an engaged manner.

Herein, the first circuit unit 20 is fixedly disposed on an outer surface of the inner tube 102.

Further, referring to FIG. 1 to FIG. 3, in this embodiment, an inner surface of the inner tube 102 has a first blocking portion 1023, a second blocking portion 1024, a third blocking portion 1025, and a fourth blocking portion 1026 in sequence. The first blocking portion 1023, the second blocking portion 1024, the third blocking portion 1025, and the fourth blocking portion 1026 are raised blocks extending from the inner surface of the inner tube 102 along a radial direction Y. Based on this, the first blocking portion 1023, the second blocking portion 1024, the third blocking portion 1025, and the fourth blocking portion 1026 cause the inner surface of the inner tube 102 to become a non-planar structure so as to be divided into multiple sections. In addition, the first blocking portion 1023 is closest to the threaded portion 1021 of the inner tube 102, and the fourth blocking portion 1026 is farthest from the threaded portion 1021.

Referring to FIG. 1 to FIG. 3, herein, the first electromagnetic unit 40 is located between the first blocking portion 1023 of the inner tube 102 and an end portion having the threaded portion 1021. The first magnet 41 of the first electromagnetic unit 40 abuts against the first blocking portion 1023, and the first coil 42 is wound outside the first magnet 41 and is electrically connected to the first circuit unit 20.

Referring to FIG. 1 to FIG. 3, the lead storage tube 31 of the lead propelling unit 30 is sheathed in the inner tube 102 on an end, provided with the second clamping portion 1022, of the inner tube 102. The tip sleeve 32 is sheathed in the first through hole 411 of the first magnet 41. When the head cover 103 is in a threaded connection with the inner tube 102, the tip sleeve 32 abuts against the head cover 103 and is limited within the head cover 103. The graphite lead 33 is accommodated in the lead storage tube 31 and is output from the port 12 of the head cover 103 through the tip sleeve 32 to perform writing with physical ink. Therefore, a user can perform writing with physical ink by using the tip sleeve 32, and digital handwriting is generated and recorded through electromagnetic induction between the first electromagnetic unit 40 and the digitizer in a writing process.

In addition, in the foregoing embodiment, because the head cover 103 and the tail cover 104 of the housing 10 can be disassembled from the pencil body, the tail cover 104 may be disassembled when the graphite lead 33 is used up, to supplement the graphite lead 33. When the graphite lead 33 is broken in the tip sleeve 32, the head cover 103 may be disassembled to remove the broken graphite lead 33.

Further, in an embodiment, referring to FIG. 1 to FIG. 3, the first electromagnetic unit 40 further includes an auxiliary magnet 43. The auxiliary magnet 43 is fixedly disposed on an inner side, close to the port 12, of the head cover 103. Herein, a shape of a peripheral outline of the auxiliary magnet 43 corresponds to a shape of the inner side of the head cover 103, and a through hole 431 is provided at a central position of the auxiliary magnet 43 for the graphite lead 33 to pass therethrough. When the head cover 103 is disposed in the inner tube 102 in an engaged manner, one end of the auxiliary magnet 43 abuts against the port 12, and the other end abuts against the tip sleeve 32 and the first magnet 41. Therefore, the auxiliary magnet 43 is added to gather magnetic field energy, thereby improving accuracy of electromagnetic sensing.

In an embodiment, referring to FIG. 1 to FIG. 3, the lead propelling assembly 34 includes a propelling tube 341, a first elastic member 342, a sleeve member 343, and a clamping tube 344.

Referring to FIG. 3, in an embodiment, the propelling tube 341 has a hollow tubular structure, and the propelling tube 341 is capable of displacement along the axial direction X and is accommodated in the inner tube 102 and is sleeved over the lead storage tube 31, and can be linked with the lead storage tube 31. Herein, the propelling tube 341 has an inner surface 3411 and an outer surface 3412 that extend to connect to two ends, and the inner surface 3411 of the propelling tube 341 is provided with an annular pressing portion 3413 between the two ends. A space enclosed by the inner surface 3411 of the propelling tube 341 is divided by the annular pressing portion 3413 into a first cavity portion 3414 and a second cavity portion 3415.

Referring to FIG. 3, the outer surface 3412 of the propelling tube 341 has a first flange 3416 and a second flange 3417. The first flange 3416 is located on an end of the propelling tube 341, and the second flange 3417 is located between the two ends of the propelling tube 341. Outer diameters of the first flange 3416 and the second flange 3417 are greater than an outer diameter of the outer surface 3412 of the propelling tube 341.

Referring to FIG. 3, when the propelling tube 341 is accommodated in the inner tube 102, the first flange 3416 of the propelling tube 341 is located between the first blocking portion 1023 and the second blocking portion 1024 of the inner tube 102. The second flange 3417 of the propelling tube 341 is located between the second blocking portion 1024 and the third blocking portion 1025 of the inner tube 102. Therefore, a range within which the propelling tube 341 displaces along the axial direction X in the inner tube 102 is definitely limited.

Further, to facilitate assembly of the inner tube 102 and the lead propelling assembly 34, the inner tube 102 may be composed of two separate components through alignment. Therefore, the lead propelling assembly 34 can be accommodated and assembled in the inner tube 1402.

Referring to FIG. 3, the first elastic member 342 is accommodated in the second cavity portion 3415 of the propelling tube 341, and one end of the first elastic member 342 abuts against the annular pressing portion 3413. Further, in this embodiment, one end of the lead storage tube 31 penetrates into the second cavity portion 3415 of the propelling tube 341 and abuts against the other end of the first elastic member 342. The first elastic member 342 provides an elastic force to the lead storage tube 31 in the axial direction X.

Referring to FIG. 3, the sleeve member 343 is plug-connected to the first cavity portion 3414 of the propelling tube 341. Herein, the sleeve member 343 has a sleeve segment 3431 and a stopping edge 3432. The overall sleeve member 343 is a hollow structure having two open ends, and an outer diameter of the stopping edge 3432 is greater than an outer diameter of the sleeve segment 3431. Herein, the sleeve segment 3431 of the sleeve member 343 is fixed to the first cavity portion 3414 of the propelling tube 341, and an outer surface of the sleeve segment 3431 is in close contact with the inner surface 3411 of the first cavity portion 3414 of the propelling tube 341. The stopping edge 3432 is located outside the first cavity portion 3414 and abuts against the first flange 3416 of the propelling tube 341. In an embodiment, the sleeve member 343 may have a tubular structure made of a metal material.

Referring to FIG. 3, the clamping tube 344 is capable of displacement along the axial direction X and is sheathed in the sleeve member 343. Herein, the clamping tube 344 has a tube portion 3441 and a plurality of jaws 3442. The tube portion 3441 is a tubular structure whose outline is closed, and one end of each of the plurality of jaws 3442 is connected to the tube portion 3441, and slits are provided between the plurality of jaws 3442. Therefore, when the jaws 3442 are under no stress, the slits between the jaws 3442 cause the jaws 3442 to be separated from each other and expand. When the jaws 3442 are under stress, the slits between the jaws 3442 disappear, and the jaws 3442 are close to each other and contract. Herein, when the jaws 3442 of the clamping tube 344 are correspondingly located in the sleeve member 343, the jaws 3442 are tightened and contract. When the jaws 3442 are separated from the sleeve member 343, the jaws 3442 are separated from each other and expand.

Herein, referring to FIG. 3, the tube portion 3441 of the clamping tube 344 enters the second cavity portion 3415 of the propelling tube 341 through the sleeve member 343 and is plug-connected to and fixed in the lead storage tube 31. In addition, the jaws 3442 of the clamping tube 344 are correspondingly located in the sleeve segment 3431 of the sleeve member 343. The sleeve member 343 and the jaws 3442 are linked by using a friction force and are capable of driving each other.

Figure 5:
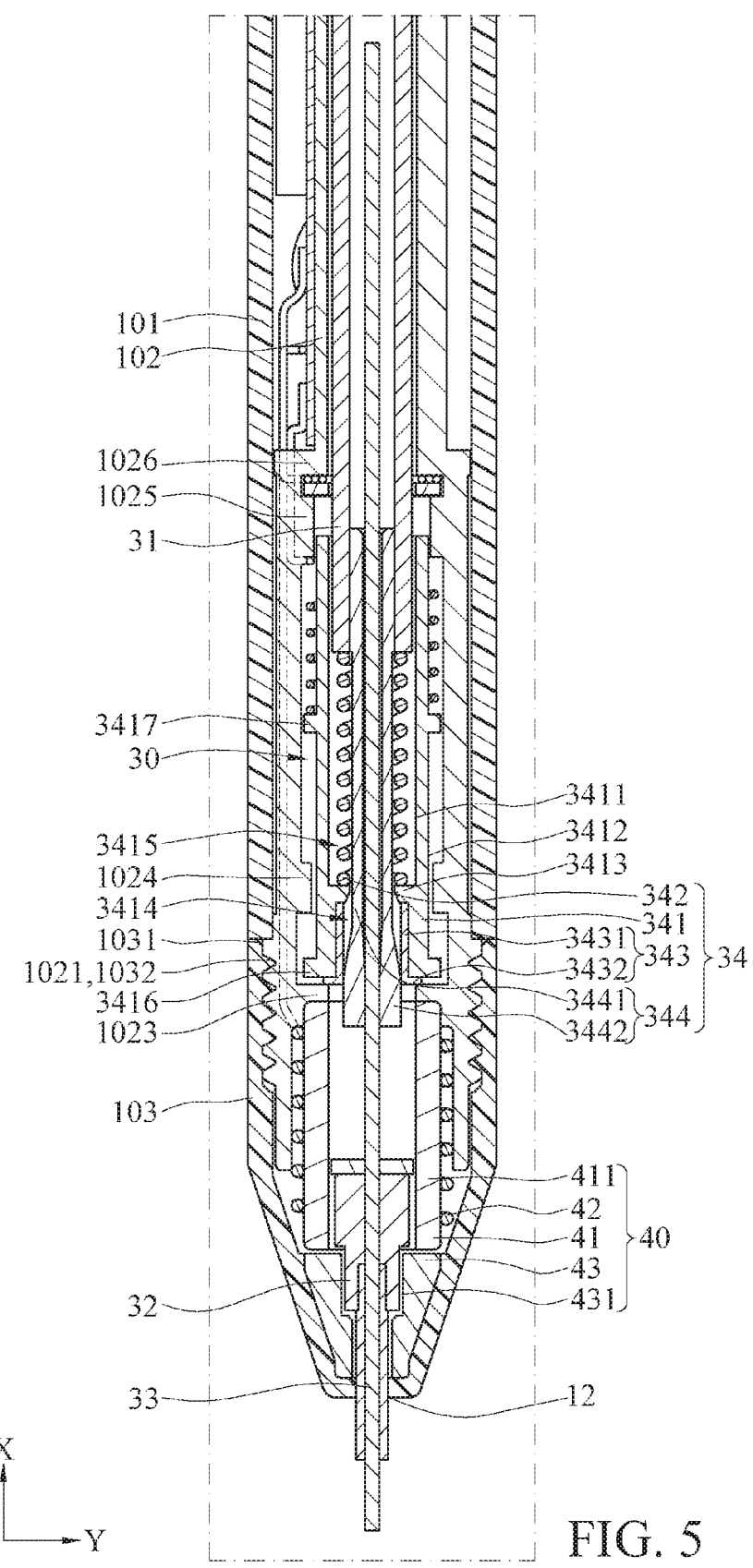
FIG. 5 is a schematic diagram of an action of outputting a graphite lead in an example in FIG. 3.

Further, the graphite lead 33 is an elongated structure and accommodated in the lead storage tube 31, and penetrates through the clamping tube 344 and the tip sleeve 32 in sequence and then penetrates out. When the jaws 3442 of the clamping tube 344 are in a contracted state, a friction force is provided between each of the jaws 3442 and the graphite lead 33 so that the jaws 3442 and the graphite lead 33 can be located at stable relative positions. To be specific, when the jaws 3442 are in a contracted state, the jaws 3442 of the clamping tube 344 can clamp the graphite lead 33 for stable writing. As shown in FIG. 5, herein, the graphite lead 33 can be in close contact with a paper or another writing plane for writing.

When the graphite lead 33 extending out of the tip sleeve 32 is used for a period of time and cannot be used because a length is reduced, a user may apply pressure to the lead storage tube 31 to a direction of the port 12 in the axial direction X, so that the lead storage tube 31 drives the lead propelling assembly 34 to output the graphite lead 33.

Specifically, referring to FIG. 5, when the lead storage tube 31 compresses the first elastic member 342 along the axial direction X, the lead storage tube 31 drives the clamping tube 344 to displace along a direction toward of the first electromagnetic unit 40, and the clamping tube 344 can drive, by using the sleeve member 343, the propelling tube 341 to displace. When the lead storage tube 31 continuously compresses the first elastic member 342 to displace along a direction toward the port 12 along the axial direction X, the lead storage tube 31 continuously drives the sleeve member 343 and the propelling tube 341 to displace toward the port 12 along the axial direction X. When the sleeve member 343 is driven to the stopping edge 3432 to abut against the first blocking portion 1023, the sleeve member 343 is stopped and cannot continue displacing, the lead storage tube 31 then can continue driving the clamping tube 344 to displace along the axial direction X, and the clamping tube 344 drives the graphite lead 33 to displace along the axial direction X at the same time.

Then, after the sleeve member 343 is stopped, the clamping tube 344 continues displacing so that the jaws 3442 are separated from the sleeve segment 3431 and expand to release the graphite lead 33. In this case, the graphite lead 33 is output, and a user may freely push and pull the graphite lead 33 to extend out of the tip sleeve 32 or be contracted into the tip sleeve 32.

It can be learned from the above that when the user presses the lead storage tube 31, to cause the lead storage tube 31 to apply a force along the axial direction X to the first elastic member 342, the lead storage tube 31 can first drive the graphite lead 33 to displace along the axial direction X to extend out of the tip sleeve 32. When the force applied to the lead storage tube 31 is released, the first elastic member 342 performs elastic restoration and drives the lead storage tube 31 to reversely restore to an initial position. In this case, the lead storage tube 31 drives the clamping tube 344 to reversely displace, and a force of reserve displacement of the clamping tube 344 drives, by using the sleeve member 343, the propelling tube 341 to reversely displace. After the propelling tube 341 reversely displaces to cause the first flange 3416 to abut against the second blocking portion 1024 of the inner tube 102, a force of reverse displacement of the clamping tube 344 causes the jaws 3442 to continue displacing to be contracted into the sleeve member 343, so that the jaws 3442 restores to a state of clamping the graphite lead 33.

To be specific, when the user continuously presses and releases the lead storage tube 31, the graphite lead 33 in the lead storage tube 31 can be continuously pushed for use, and after pressure applied to the lead storage tube 31 is released, the graphite lead 33 can be made to be stably clamped and positioned.

Figure 4:
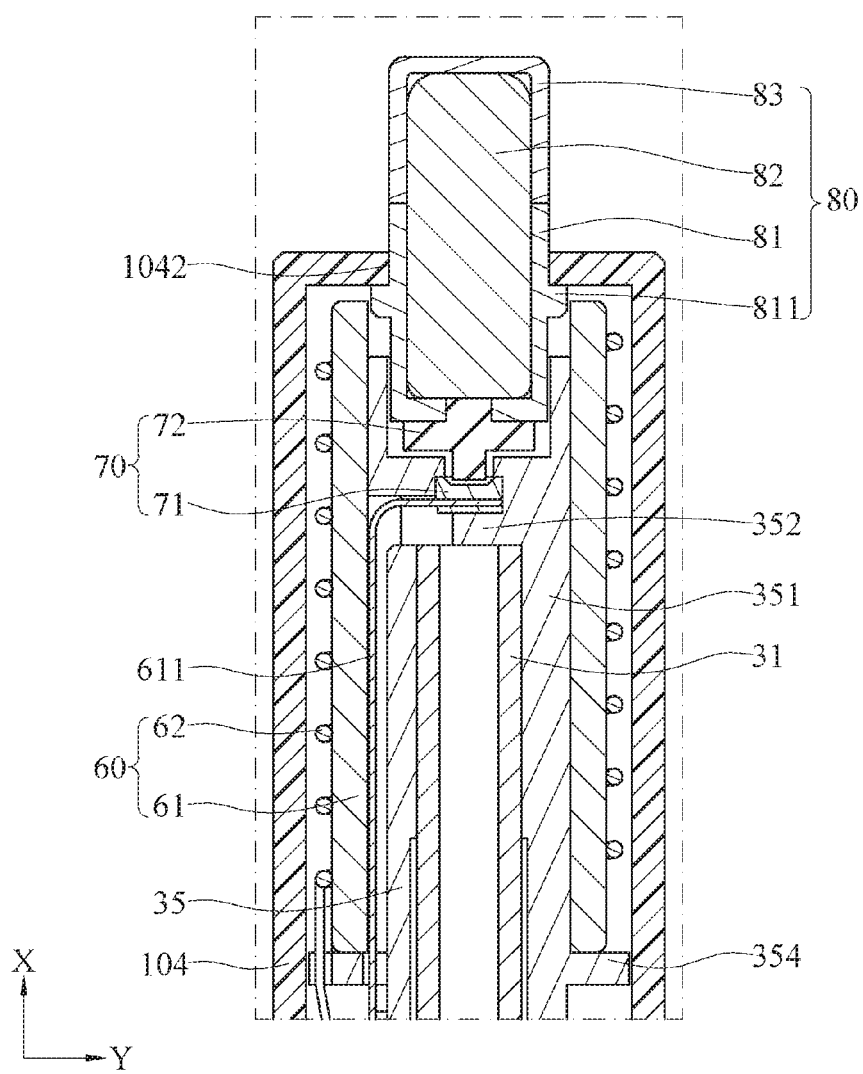
FIG. 4 is a partially enlarged view of a part 4 marked with a circle in FIG. 1.

Further, referring to FIG. 1 and FIG. 2 again together with FIG. 4, to facilitate an operation of pressing the lead storage tube 31, the lead propelling unit 30 further includes a guide package 35. The guide package 35 is disposed at the tail cover 104 to drive and guide the lead storage tube 31 to displace along the axial direction X.

Referring to FIG. 2 and FIG. 4, herein, the guide package 35 has a sleeve portion 351, a guide portion 353, and a pressing portion 352. The sleeve portion 351 is a hollow pole structure and can wrap and be sleeved over the periphery of the lead storage tube 31. The pressing portion 352 extends along the radial direction Y from an inner surface, toward the lead storage tube 31, of the sleeve portion 351, and the pressing portion 352 is located on an end, away from the tip sleeve 32, of the sleeve portion 351. Therefore, after the guide package 35 is sleeved over the lead storage tube 31, the pressing portion 352 can be pressed against one end of the lead storage tube 31. The guide portion 353 is located on the other surface of the sleeve portion 351 and extends along the radial direction Y. Herein, an outer diameter of the guide portion 353 of the guide package 35 is closer to an inner diameter of the tail cover 104 than an outer diameter of the sleeve portion 351.

In this way, when a force is applied to the guide package 35, the guide package 35 presses the lead storage tube 31 by using the pressing portion 352 to synchronously drive the lead storage tube 31 to displace along the axial direction X. While the guide package 35 drives the lead storage tube 31 to displace, the guide package 35 is guided by an inner surface of the tail cover 104 by using the guide portion 353 to limit a deflection amount of the guide package 35 relative to the axial direction X, thereby ensuring that the guide package 35 can stably drive the lead storage tube 31 to displace along the axial direction X, to reduce deflection of the lead storage tube 31 toward a direction other than the axial direction X and improve operation stability.

Further, referring to FIG. 3, the lead propelling unit 30 further includes a conductive unit 36, and the conductive unit 36 is electrically connected to the first circuit unit 20. In a process of a writing action, the graphite lead 33 is pressed to drive the lead propelling assembly 34 to be conducted with the conductive unit 36, so that the first circuit unit 20 receives information about the writing action.

Referring to FIG. 3, herein, the conductive unit 36 includes a first conductive elastomer 361, a second conductive elastomer 362, and an electric conductor 363. In this embodiment, the lead propelling assembly 34 is conductive, and conductivity of the lead propelling assembly 34 may come from conductivity of the overall propelling tube 341. An implementation mode that the overall propelling tube 341 is conductive may be that the overall propelling tube 341 is made of a metal material or has an outer surface that is of a non-conductive material and that is metal-plated, but is not limited thereto.

Referring to FIG. 3, the first conductive elastomer 361 is a conductive ring spring. Herein, the first conductive elastomer 361 is a ring compression spring of a metal material but is not limited thereto. The first conductive elastomer 361 penetrates through the outer surface 3412 of the propelling tube 341, and the first conductive elastomer 361 is located between the second flange 3417 of the propelling tube 341 and the third blocking portion 1025 of the inner tube 102. Therefore, the propelling tube 341 can be engaged with the first conductive elastomer 361 to provide elastic displacement. In addition, the first conductive elastomer 361 is electrically connected to the first circuit unit 20 through a conductive line or an integrally formed spring.

Referring to FIG. 3, the second conductive elastomer 362 is a conductive ring spring. Herein, the second conductive elastomer 362 is a ring compression spring of a metal material but is not limited thereto. The electric conductor 363 is a conductive block. Herein, the electric conductor 363 may be a metal block, a conductive rubber block, or a conductive silica gel block, but is not limited thereto.

Referring to FIG. 3 again, the electric conductor 363 is fixed in the housing 10. Specifically, the electric conductor 363 and the second conductive elastomer 362 are located between the third blocking portion 1025 and the fourth blocking portion 1026 of the inner tube 102. The electric conductor 363 is in contact with the second conductive elastomer 362 and is close to the third blocking portion 1025. The second conductive elastomer 362 is close to the fourth blocking portion 1026. In addition, the second conductive elastomer 362 is electrically connected to the first circuit unit 20 through a conductive line or an integrally formed spring.

Figure 6:
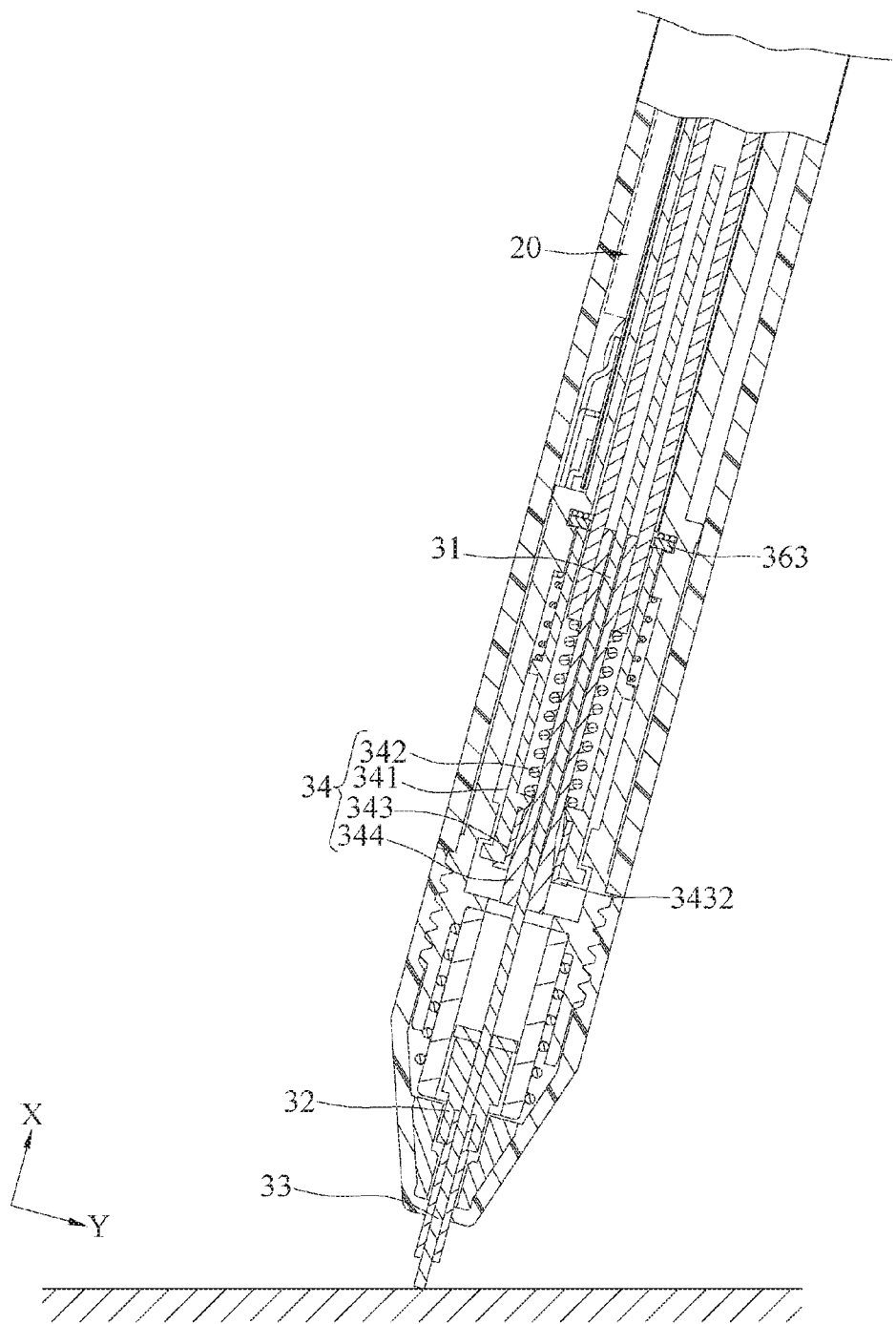
FIG. 6 is a schematic diagram of an action of writing in an example in FIG. 3.

Based on this, referring to FIG. 6, when an action of ink writing is performed, the writing action applies pressure to the tip sleeve 32 by using the graphite lead 33, and the tip sleeve 32 and the graphite lead 33 apply a force to the lead propelling assembly 34. The clamping tube 344, clamping the graphite lead 33, of the lead propelling assembly 34 is driven by the graphite lead 33, and then the clamping tube 344 drives, by using the sleeve member 343, the propelling tube 341 to displace toward a direction away from the tip sleeve 32. When the propelling tube 341 continues displacing toward the direction away from the tip sleeve 32, the propelling tube 341 gets in contact with the electric conductor 363. When the propelling tube 341 gets in contact with the electric conductor 363, the propelling tube 341, the electric conductor 363, and the first circuit unit 20 are conducted to form a loop. When the propelling tube 341, the electric conductor 363, and the first circuit unit 20 are conducted to form a loop, a signal can be transferred to the first circuit unit 20, and the digitizer can determine that the pointer is performing ink writing to generate and record digital handwriting by means of an operation.

Further, referring to FIG. 1, FIG. 2, and FIG. 4, the pointer further includes a second circuit unit 50, a second electromagnetic unit 60, a pressure sensing unit 70, and a handwriting erasing assembly 80. The second circuit unit 50, the second electromagnetic unit 60, and the pressure sensing unit 70 are separately disposed in the housing 10. The second circuit unit 50 is electrically connected to the second electromagnetic unit 60, and the handwriting erasing assembly 80 can erase ink handwriting or cooperate with the second electromagnetic unit 60 to erase digital handwriting. In addition, when the handwriting erasing assembly 80 is pressed, pressure is applied to the pressure sensing unit 70 to sense a force of the handwriting erasing assembly 80, so as to further determine pressure of handwriting erasing, to change thickness of handwriting.

Referring to FIG. 1 and FIG. 2, the second circuit unit 50 is disposed in the tail cover 104. Herein, the second circuit unit 50 is fixedly disposed on an outer surface of the guide package 35 in the tail cover 104.

Referring to FIG. 1 and FIG. 4, the second electromagnetic unit 60 includes a second magnet 61 and a second coil 62. The second magnet 61 is a hollow cylindrical structure and has a second through hole 611. The second coil 62 is wound outside the second magnet 61 and is electrically connected to the second circuit unit 50. Herein, the outer surface of the guide package 35 further includes a limiting portion 354, the limiting portion 354 extends along the radial direction Y, and the limiting portion 354 is located between the guide portion 353 and the pressing portion 352. Herein, the second magnet 61 is sleeved over the guide package 35 and abuts against the limiting portion 354.

Referring to FIG. 1 and FIG. 4, the pressure sensing unit 70 includes a pressure sensing element 71 and a second elastic member 72. The pressure sensing element 71 is disposed in the pressing portion 352 of the guide package 35 and is electrically connected to the second circuit unit 50. The second elastic member 72 is disposed toward the pressure sensing element 71.

Referring to FIG. 4, the handwriting erasing assembly 80 is disposed on an end, opposite to the port 12, of the housing 10 and penetrates into the second through hole 611, and the handwriting erasing assembly 80 is capable of elastic displacement toward the pressure sensing element 71. Herein, the handwriting erasing assembly 80 includes a bearing base 81, a handwriting erasing body 82, and a cap 83. The bearing base 81 is capable of displacement along the axial direction X and is accommodated in the tail cover 104, and the bearing base 81 is fixedly combined with the second elastic member 72 to drive the second elastic member 72 to synchronously displace. Specifically, the bearing base 81 is located in the second magnet 61 and the guide package 35. Further, the bearing base 81 further includes a convex stopping portion 811 at a periphery of a position between two ends, and the tail cover 104 further includes a through opening 1042. A peripheral outline of the convex stopping portion 811 is larger than an outline of the through opening 1042, so that the convex stopping portion 811 is limited by the outline of the through opening 1042 and cannot pass through the through opening 1042.

Referring to FIG. 4 again, when the bearing base 81 is located in the tail cover 104, the bearing base 81 is divided by using the convex stopping portion 811 as a boundary into two parts. One part of the bearing base 81 and the convex stopping portion 811 are located in the tail cover 104, and the other part penetrates out of the tail cover 104. Herein, the peripheral outline of the convex stopping portion 811 of the bearing base 81 is also larger than an outline of an inner diameter of the sleeve portion 351 of the guide package 35, so that the convex stopping portion 811 of the bearing base 81 is limited by the inner diameter of the sleeve portion 351 and cannot pass through the sleeve portion 351. In this way, when the bearing base 81 displaces along the axial direction X in the tail cover 104, a displacement range of the bearing base 81 is limited by the convex stopping portion 811 to be determined.

Referring to FIG. 4, the handwriting erasing body 82 may be an eraser. A part of the handwriting erasing body 82 is accommodated in the bearing base 81, and the remaining part of the handwriting erasing body 82 protrudes from the bearing base 81. The cap 83 may wrap a part of the handwriting erasing body 82 protruding from the bearing base 81 and be aligned with the bearing base 81.

Figure 7:
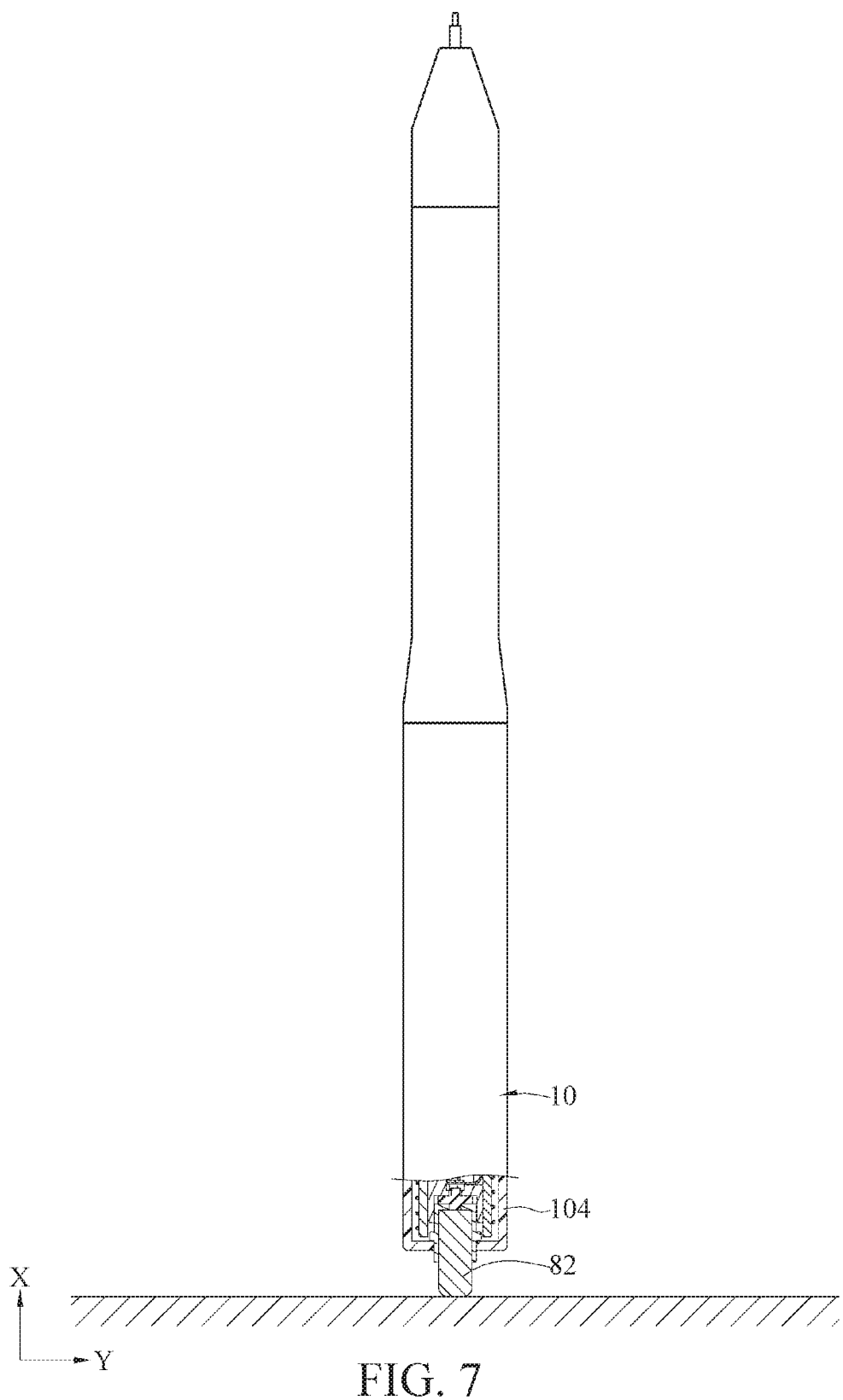
FIG. 7 is a schematic diagram of using a handwriting erasing body.

Referring to FIG. 4, herein, a width of a part, combined with the bearing base 81, of the second elastic member 72 in the radial direction Y is greater than that of a part in contact with the pressure sensing element 71. Therefore, pressure levels can be better presented. According to the above, this embodiment may be applicable to erasing of ink handwriting and digital handwriting. When the ink handwriting is to be erased, referring to FIG. 7, provided that the cap 83 is separated to expose the handwriting erasing body 82, the handwriting erasing body 82 abuts against the ink handwriting for performing repeated erasing, so as to erase the ink handwriting.

When the digital handwriting is to be erased, in a state in which the cap 83 is separated or the cap 83 is not separated, a part of the handwriting erasing assembly 80 on which the tail cover 104 is exposed is used to abut against the digital handwriting for performing repeated erasing. When the handwriting erasing assembly 80 abuts against the digital handwriting for performing repeated erasing, the handwriting erasing assembly 80 drives the second elastic member 72 to press the pressure sensing element 71, and the pressure sensing element 71 senses pressure applied by the handwriting erasing assembly 80. When the pressure sensing element 71 senses the pressure applied by the handwriting erasing assembly 80, thickness of the digital handwriting can be changed or the digital handwriting can be removed by means of an operation by the second circuit unit 50. In this way, artistic presentation of fading or eliminating handwriting or a pattern can be provided by use of the handwriting erasing assembly 80.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An automatic pencil type pointer, comprising:
    a housing, having a port and an accommodation space, wherein the port is in communication with the accommodation space;
    a first circuit unit, disposed in the accommodation space;
    a lead propelling unit, disposed in the accommodation space and comprising a lead storage tube, a tip sleeve, a graphite lead, and a lead propelling assembly, wherein
        the lead storage tube has an accommodation cavity,
        the tip sleeve is disposed at the port,
        the graphite lead is accommodated in the accommodation cavity, and
        the lead propelling assembly is disposed between the tip sleeve and the lead storage tube and is capable of controlling the graphite lead to be output from the tip sleeve; and
    a first electromagnetic unit, disposed in the accommodation space and comprising a first magnet, a first coil and an auxiliary magnet, wherein
        the first magnet has a penetrating first through hole,
        the first coil is wound around the first magnet and is electrically connected to the first circuit unit,
        the auxiliary magnet has a through hole, and abuts against the first magnet, and
        the graphite lead passes through both the through hole of the auxiliary magnet and the first through hole of the first magnet.

2. The automatic pencil type pointer according to claim 1, further comprising a second circuit unit, a second electromagnetic unit, and a handwriting erasing assembly, wherein the second circuit unit and the second electromagnetic unit are electrically connected and are separately disposed in the housing, the second electromagnetic unit comprises a second magnet and a second coil, the second magnet has a second through hole, the second coil is wound outside the second magnet, the handwriting erasing assembly is disposed on an end, opposite to the port, of the housing and penetrates into the second through hole, and the handwriting erasing assembly comprises an alternative handwriting erasing body.

3. The automatic pencil type pointer according to claim 2, further comprising a pressure sensing element, wherein the pressure sensing element is disposed in the housing and is electrically connected to the second circuit unit, and the handwriting erasing assembly is capable of elastic displacement toward the pressure sensing element.

4. The automatic pencil type pointer according to claim 3, further comprising a second elastic member, located between the pressure sensing element and the handwriting erasing assembly.

5. The automatic pencil type pointer according to claim 4, wherein the handwriting erasing assembly further comprises a bearing base and a cap, the bearing base is disposed in the housing in a manner of being capable of displacement and is fixedly combined with the second elastic member, the handwriting erasing body is accommodated in the bearing base, and the cap is capable of being aligned with the bearing base and wraps the handwriting erasing body.

6. The automatic pencil type pointer according to claim 2, wherein the housing further comprises a tail cover, and the second circuit unit, the second electromagnetic unit, and the handwriting erasing assembly are disposed in the tail cover.

7. The automatic pencil type pointer according to claim 1, wherein the housing comprises a pencil body and a head cover, the head cover is detachably disposed in the pencil body, and the auxiliary magnet is disposed in the head cover.

8. An automatic pencil type pointer, comprising:
    a housing, having a port and an accommodation space, wherein the port is in communication with the accommodation space;
    a first circuit unit, disposed in the accommodation space;
    a lead propelling unit, disposed in the accommodation space and comprising a lead storage tube, a tip sleeve, a graphite lead, a lead propelling assembly, and a conductive unit, wherein
        the lead storage tube has an accommodation cavity,
        the tip sleeve is disposed at the port,
        the graphite lead is accommodated in the accommodation cavity, and
        the lead propelling assembly is disposed between the tip sleeve and the lead storage tube and is capable of controlling the graphite lead to be output from the tip sleeve,
        the conductive unit and the lead propelling assembly are separately electrically connected to the first circuit unit, and
        the graphite lead drives the lead propelling assembly to be conducted with the conductive unit when being pressed; and
    a first electromagnetic unit, disposed in the accommodation space and comprising a first magnet and a first coil, wherein
        the first magnet has a penetrating first through hole,
        the first coil is wound around the first magnet and is electrically connected to the first circuit unit, and
        the graphite lead passes through the first through hole.

9. The automatic pencil type pointer according to claim 8, wherein the conductive unit comprises an electric conductor, the electric conductor is disposed in the housing, and the lead propelling assembly is conductive.

10. The automatic pencil type pointer according to claim 9, wherein the conductive unit further comprises a first conductive elastomer and a second conductive elastomer, the lead propelling assembly comprises a propelling tube, the propelling tube is sleeved over the lead storage tube and is linked with the graphite lead, the first conductive elastomer is sleeved over the propelling tube, and the second conductive elastomer is in contact with the electric conductor.

* * * * *